United States Patent
Perry et al.

(10) Patent No.: US 6,289,697 B1
(45) Date of Patent: Sep. 18, 2001

(54) APPARATUS AND METHOD FOR CONTROLLING MOLTEN GLASS FLOW THROUGH A FOREHEARTH

(75) Inventors: Philip D. Perry, Perrysburg; Michael T. Dembicki, Pemberville, both of OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/450,453

(22) Filed: Nov. 29, 1999

(51) Int. Cl.[7] .................................................. C03B 5/26
(52) U.S. Cl. ............................. 65/164; 65/29.17; 65/160; 65/347
(58) Field of Search .................................. 65/29.17, 158, 65/161, 347, 160, 164

(56) References Cited

U.S. PATENT DOCUMENTS

| | | |
|---|---|---|
| 3,380,463 * | 4/1968 | Trethewey . |
| 3,469,962 | 9/1969 | Owen . |
| 3,476,538 | 11/1969 | Trethewey . |
| 3,482,956 * | 12/1969 | Trethewey ............................. 65/29.17 |
| 3,573,015 | 3/1971 | Canfield . |
| 3,573,019 | 3/1971 | Rees . |
| 3,730,695 | 5/1973 | Varrasso . |
| 4,478,628 * | 10/1984 | Dunn .................................... 65/29.17 |
| 5,618,325 | 4/1997 | Baniel . |
| 5,925,163 | 7/1999 | Evans et al. . |
| 5,944,863 | 8/1999 | Scott . |

* cited by examiner

Primary Examiner—James Derrington

(57) ABSTRACT

Apparatus for controlling rate of molten glass flow through a forehearth that includes a flume disposed in the forehearth for restricting the width of the forehearth to glass flow, such that there is a difference in level of molten glass in the forehearth upstream and downstream of the flume. Sensors measure the level of molten glass upstream and downstream of the flume, and a controller is responsive to the sensors for determining rate of molten glass flow through the forehearth as a function of a difference in molten glass level between the sensors. Rate of glass flow through the forehearth is controlled as a function of the difference in glass level across the flume as compared with a desired flow rate set by an operator.

7 Claims, 2 Drawing Sheets

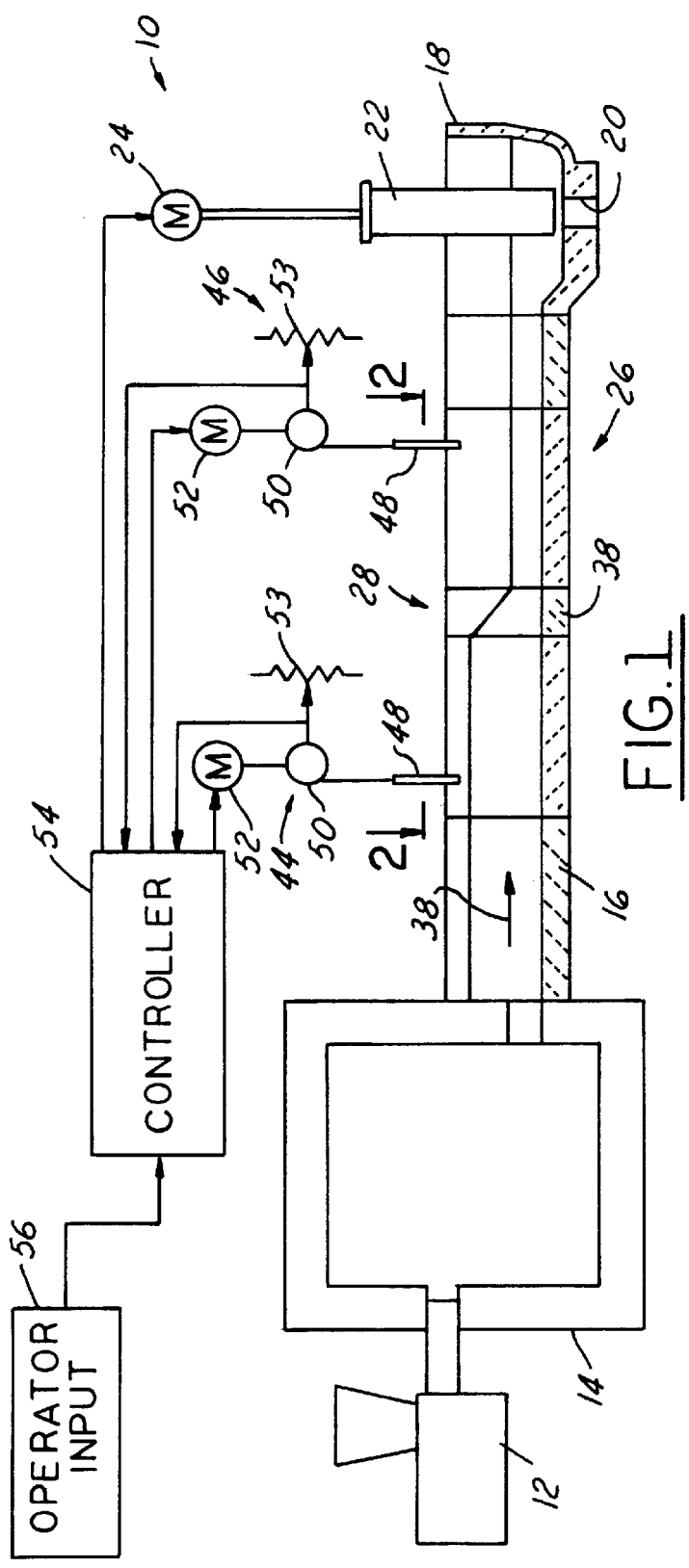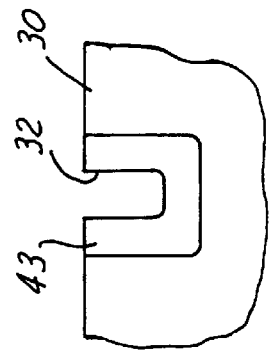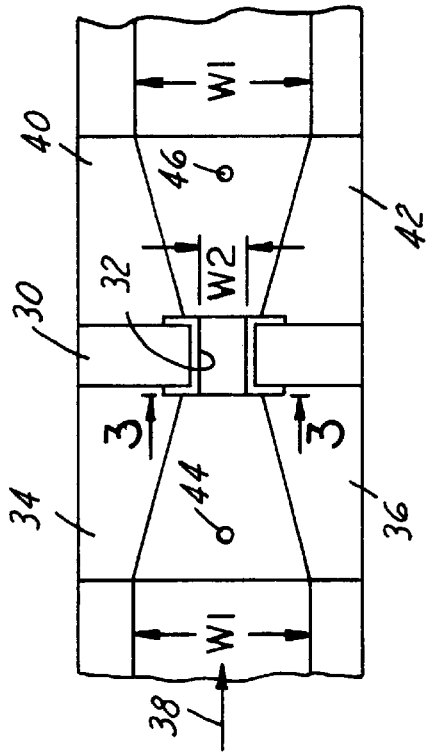

APPARATUS AND METHOD FOR CONTROLLING MOLTEN GLASS FLOW THROUGH A FOREHEARTH

The present invention is directed to delivery of a glass stream for forming glass charges or gobs for glassware manufacture, and more particularly to a method and apparatus for measuring and controlling rate of glass flow through a forehearth.

BACKGROUND AND SUMMARY OF THE INVENTION

In the art and science of glassware manufacture, there are two basic methods currently employed for measuring rate of molten glass flow, such as in tons per day. The first method is to obtain a sample of glass as it exits the forehearth/feeder orifice, and weigh the sample. Although this technique provides an accurate measurement of glass flow, it causes loss of production due to the sampling. The second method is an indirect method, in that the glass flow is calculated by averaging batch charger material flow to the furnace. Although this method provides a fairly accurate measurement in a system in which the furnace feeds a single forehearth, it is ineffective for systems in which the furnace feeds two or more forehearths.

It is therefore a general object of the present invention to provide a method and apparatus for measuring molten glass flow through a forehearth that are accurate, that are implemented in the forehearth, and therefore can be readily employed in systems in which a furnace feeds more than one forehearth, and that do not require interruption of operation of the glassware forming system. Another and more specific object of the present invention is to provide a method and apparatus of the described character for both measuring and controlling rate of molten glass flow, in which glass flow adjustments are automatically implemented.

Apparatus for controlling rate of molten glass flow through a forehearth in accordance with one aspect of the presently preferred embodiment of the invention includes a flume disposed in the forehearth for restricting the width of the forehearth to glass flow, such that there is a difference in level of molten glass in the forehearth upstream and downstream of the flume. Sensors measure the level of molten glass upstream and downstream of the flume, and a controller is responsive to the sensors for determining rate of molten glass flow through the forehearth as a function of a difference in molten glass level between the sensors. In the preferred implementation of the invention, rate of glass flow through the forehearth is controlled as a function of the difference in glass level across the flume.

In the preferred implementation of the invention, the forehearth terminates in a spout having a lower opening for delivering molten glass. A flow control tube is disposed within the spout for movement toward and away from the spout opening to restrict or increase glass flow through the opening. Position of the flow control tube is controlled responsive to the controller for moving the tube with respect to the opening when rate of glass flow through the flume departs from a desired glass flow rate input by an operator. In glass flow systems that include multiple forehearths fed by a single furnace, the glass level measurement sensors and the flow control tubes in each forehearth operate independently of each other.

The flume is preferably disposed with respect to the direction of glass flow through the forehearth such that the depth of the forehearth and flume to glass flow remains constant, while the width to glass flow is the same upstream and downstream of the flume, while the flume includes a smooth transition upstream and downstream of a flume restriction to glass flow. This restriction preferably is coated with platinum or other corrosion-resistant material both to prevent pick-up of stones or particles in the glass eroded from the flume, and to maintain a constant flume cross-section to glass flow. The sensors in the preferred embodiment of the invention comprise contact-type sensors that are disposed above the forehearth, and are selectively lowered and brought into contact with the molten glass surface. Variable resistors or other suitable devices are coupled to the sensors for determining sensor position. The sensors preferably are zeroed prior to glass flow by lowering the sensors against a bottom wall surface of the forehearth. Knowing (or measuring) glass viscosity and temperature at the restriction area, glass flow can be accurately calculated based upon the difference in surface level upstream and downstream in the flume.

BRIEF DESCRIPTION OF THE DRAWINGS

The invention, together with additional objects, features and advantages thereof, will be best understood from the following description, the appended claims and the accompanying drawings in which:

FIG. 1 is a fragmentary elevational schematic diagram of a glass delivery system in accordance with one presently preferred embodiment of the invention;

FIG. 2 is a fragmentary top plan view taken from the direction 2—2 in FIG. 1;

FIG. 3 is a fragmentary sectional view taken substantially along the line 3—3 in FIG. 2;

DETAILED DESCRIPTION OF PREFERRED EMBODIMENTS

Figure 4:
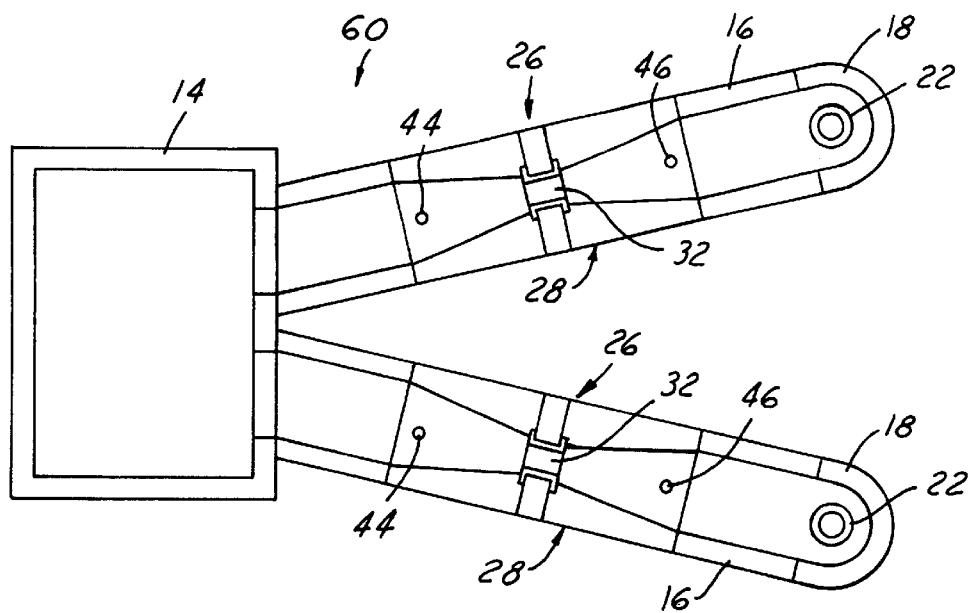
FIG. 4 is a top plan schematic diagram of a glass delivery system in accordance with the present invention comprising a furnace feeding a pair of forehearths.

The disclosure of U.S. Pat. No. 5,944,863 is incorporated herein by reference.

FIGS. 1–3 illustrate a glass delivery system 10 in accordance with one presently preferred embodiment of the invention. A glass batch charger 12 feeds glass to a furnace 14, in which the glass is melted and fed in molten form to a forehearth 16. Glass flows through forehearth 16 to a glass delivery spout 18, which has an opening 20 at its lower end. A glass delivery control tube 22 is variably positionable within spout 18, and is coupled to a motor 24 for movement toward and away from spout opening 20 for controlling the rate of glass flow through the spout opening.

Apparatus 26 for measuring and controlling rate of glass flow through forehearth 16 in accordance with a presently preferred embodiment of the invention comprises a flume 28 positioned within forehearth 16 for restricting glass flow through the forehearth. Flume 28 comprises a restriction block 30 that spans the width of forehearth 16, and provides a U-shaped restriction opening 32 approximately centrally of the forehearth. A first pair of complementary transition blocks 34, 36 are positioned upstream of restriction block 30 (with respect to the direction 38 of molten glass flow through the forehearth) for providing a smooth transition between the width W1 of forehearth 16, and the width W2 of opening 32. A second pair of transition blocks 40, 42 are provided on the downstream side of restriction block 30, again for providing a smooth transition between the width W2 of opening 32 and the width W1 of forehearth 16. The width W1 of forehearth 16 to glass flow is the same upstream and downstream of flume 26, and the depth of forehearth 16 and flume 26 is constant, as best seen in FIG. 1. Restriction block 30, transitions blocks 34, 36, 40, 42, and the blocks that make up the sidewalls of forehearth 16 may be of suitable high-temperature ceramic construction. Restriction opening or passage 32 is preferably provided with a coating 43 of platinum or other high-temperature corrosion-resistant material to prevent erosion of the ceramic material caused by restricted glass flow through the flume. Prevention of erosion not only helps prevent pick-up of ceramic particles in the molten glass stream, which may subsequently appear in the manufactured glassware, but also helps maintain a constant cross-section to glass flow at restriction opening 32. Maintaining a constant cross-section to glass flow helps maintain accuracy of the glass flow measurement.

A pair of level measurement sensors 44, 46 are mounted above forehearth 16 upstream and downstream of flume restriction block 38 respectively. Sensors 44, 46 are identical, and each comprise a contact-type probe 48 coupled by a suitable mechanism 50 to a motor or actuator 52 for vertically lowering and raising probe 48 with respect to forehearth 16. Each probe 48 is coupled to a sensor, such as a variable resistor 53, for providing an absolute measurement of probe vertical position. Sensor motors 52, as well as control tube motor 24, are coupled to a suitable electronic controller 54. Controller 54 receives input signals from variable resistors 53 indicative of position of the associated probes 48, as well as input signals from an operator input terminal or device 56.

Figure 5:
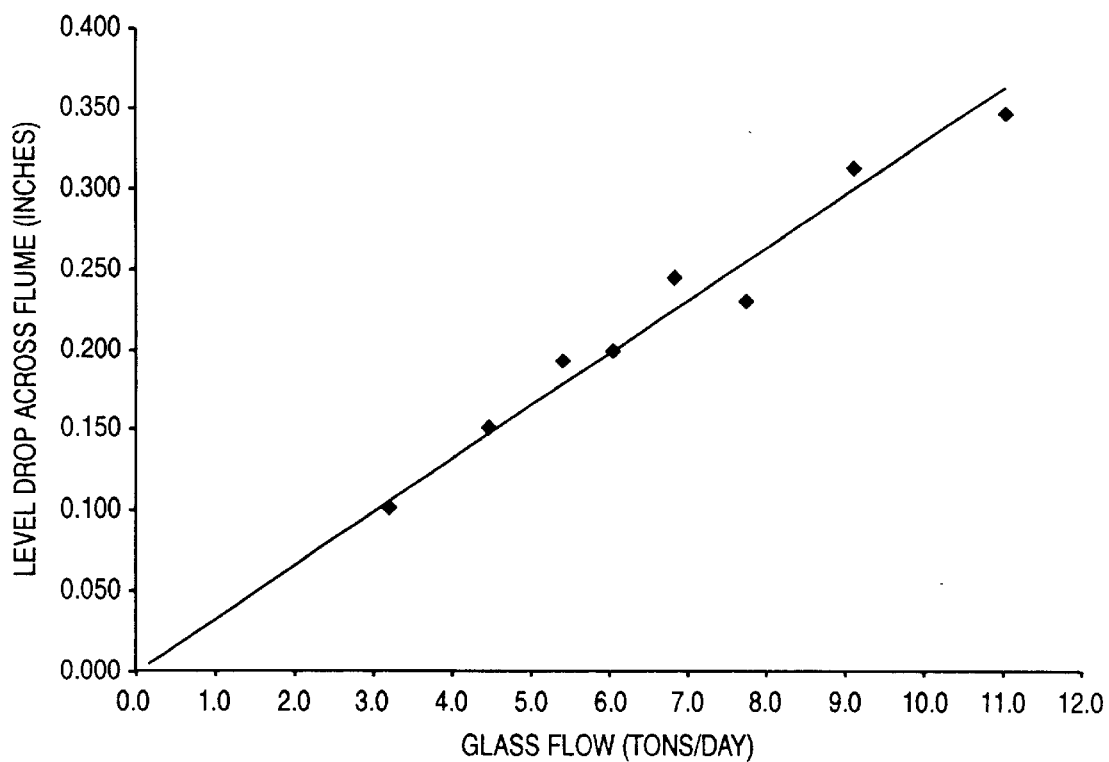
FIG. 5 is a graph that illustrates operation of the invention.

In operation, sensors 44, 46 are first zeroed by lowering the sensors probes 48 against the bottom wall surface of forehearth 16 before glass flows through the forehearth. With sensor probes 48 touching the bottom surface of the forehearth, resistors 52 provide an indication of vertical level of the forehearth bottom surface, which may thereafter be compared with glass material surface level to provide an absolute measurement of glass height upstream and downstream of flume 28. Probes 48 are then withdrawn upwardly, and molten glass is permitted to flow through the forehearth from batch charger 12 and furnace 14 to spout 18 and outlet opening 20. Thereafter, sensors 44, 46 are periodically vertically lowered against the glass surface, and corresponding surface level measurements are obtained by controller 54 from variable resistors 52. Knowing (or measuring) glass temperature and viscosity, the rate of glass flow through forehearth 16 can then be readily determined based upon the level drop across the flume. FIG. 5 illustrates actual level drop across the flume in inches versus the rate of glass flow in tons per day. The illustrated data points were obtained by measuring the level drop across the flume as compared with glass flow rate determined by other means, while the line illustrates a linear calculation of flow rate versus level drop. (It will be appreciated that the level drop illustrated schematically in FIG. 1 is greatly exaggerated, and that actual level drop across the flume will be on the order of tenths or hundredths of an inch as illustrated in FIG. 5.) If glass flow rate determined by sensors 44, 46 departs from the desired level, such as input from operator panel 56, controller 54 operates motor 24 to raise or lower flow control tube 22 with respect to spout opening 20 to increase or decrease glass flow through the spout opening. At a later time suitable for the glass flow rate to reach and stabilize at a new level, level measurements are again taken at sensors 44, 46, and the position of flow control tube 22 again adjusted. The flow control tube position is preferably in preset increments after each measurement so that measured glass flow control gradually approaches the level desired by the operator, and does not overshoot the desired level.

FIG. 4 illustrates a molten glass flow control system 60 that includes a single furnace 14 feeding a pair of forehearths 16. Each forehearth 16 includes an associated outlet spout 18 with associated flow control tube 22. Each forehearth 16 also includes an associated level measurement apparatus 26, including flume 28 and associated level measurement sensors 44, 46. These level measurement sensors and flow control tubes may be operated independently of each other for independently controlling flow of molten glass through the associated forehearths. The desired flow rates through the respective forehearths need not be the same. Software in controller 54 can account for changes in temperature or viscosity, as well as changes in overall glass depth.

Level measurement sensors 44, 46 in the preferred embodiment illustrated in FIG. 1 comprise so-called "string pots" for measuring level of the molten glass under the adverse operating conditions of a glass shop. Contact-type probes 48 are of a type that change electrical characteristics when brought into surface contact with the molten glass. However, other types of measurement sensors, both contact-types and non-contact-types, may be implemented without departing from the present invention in its broadest aspects. Controller 54 may be of any suitable type.

There have thus been disclosed an apparatus and method for measuring and controlling rate of molten glass flow through a forehearth that fully satisfy all of the objects and aims previously set forth. Although the invention has been disclosed in conjunction with a presently preferred embodiment thereof, a number of modifications and variations have also been suggested. Other modifications and variations will readily suggest themselves to persons of ordinary skill in the art. The invention is intended to embrace all such modifications and variations as fall within the spirit and broad scope of the appended claims.

What is claimed is:

1. Apparatus for controlling rate of molten glass flow through a forehearth having a width and a depth, which comprises:

a flume disposed in said forehearth for restricting the width of said forehearth to glass flow while said depth remains constant, such that there is a difference in level of molten glass in the forehearth upstream and downstream of said flume, said flume being disposed with respect to the direction of glass flow through the forehearth such that the width of the forehearth to glass flow is the same upstream and downstream of said flume, said flume comprising a restriction block having a restriction passage, and transition blocks upstream and downstream of said restriction block for smooth transition of the width to glass flow from the width of said forehearth to the width of said restriction passage, sensors for measuring level of molten glass upstream and downstream of said flume, a controller responsive to said sensors for determining rate of molten glass flow through said forehearth as a function of a difference in molten glass level between said sensors, and means responsive to said controller for variably controlling rate of glass flow through the forehearth.

2. The apparatus set forth in claim 1 wherein said restriction block is platinum coated around said restriction passage.

3. The apparatus set forth in claim 1 wherein said sensors comprise first and second contact-type sensors, means coupled to said controller for selectively moving said sensors into and out of surface contact with the glass in said forehearth, and means responsive to movement of said sensors for determining molten glass levels.

4. The apparatus set forth in claim 3 wherein said means coupled to said controller comprises motorized actuators for moving said sensors vertically into and out of contact with the glass surface, and wherein said movement-responsive means comprises variable resistors coupled to said sensors.

5. The apparatus set forth in claim 1 wherein the forehearth terminates in a spout having a lower opening for delivering molten glass, a flow control tube disposed within said spout for movement toward said opening to restrict glass flow through said opening, and means responsive to said controller for moving said tube with respect to said opening when rate of glass flow through said flume departs from a desired glass flow rate.

6. A system for controlling rate of molten glass flow, which comprises:

a furnace for supplying molten glass, at least two forehearths coupled to said furnace for receiving molten glass from said furnace, a flume disposed in each said forehearth for restricting molten glass flow through the forehearth, such that there is a difference in level of molten glass in each said forehearth upstream and downstream of the associated flume, each said flume being disposed with respect to the direction of glass flow through the associated forehearth such that the width of the forehearth to glass flow is the same upstream and downstream of said flume, each said flume comprising a restriction block having a restriction passage, and transition blocks upstream and downstream of said restriction block for smooth transition of the width to glass flow from the width of said forehearth to the width of said restriction passage, sensors in each said forehearth for measuring level of molten glass upstream and downstream of the associated flume, a controller responsive to said sensors for determining rate of molten glass flow through the associated forehearth, and means responsive to said controller for variably controlling rate of glass flow through each said forehearth independently of each other.

7. The system set forth in claim 6 wherein each said forehearth terminates in a spout having a lower opening for delivering molten glass, a flow control tube disposed within said spout for movement toward and away from said opening variably to restrict glass flow through said opening, and means responsive to said controller for moving said tube with respect to said opening when rate of glass flow through said flume departs from a desired glass flow rate.

* * * * *